(12) United States Patent
Förster (10) Patent No.: US 8,676,354 B2
(45) Date of Patent: Mar. 18, 2014

(54) AUTOMATION SYSTEM HAVING FRAMEWORK BASED CONTROLLER

(75) Inventor: Ralf Förster, Essen (DE)

(73) Assignee: KHS GmbH, Dortmund (DE)

( * ) Notice: Subject to any disclaimer, the term of this patent is extended or adjusted under 35 U.S.C. 154(b) by 335 days.

(21) Appl. No.: 13/058,918

(22) PCT Filed: Sep. 2, 2009

(86) PCT No.: PCT/EP2009/006332
§ 371 (c)(1),
(2), (4) Date: Feb. 14, 2011

(87) PCT Pub. No.: WO2010/028760
PCT Pub. Date: Mar. 18, 2010

(65) Prior Publication Data
US 2012/0022669 A1    Jan. 26, 2012

(30) Foreign Application Priority Data
Sep. 9, 2008   (DE) .......................... 10 2008 047 238

(51) Int. Cl.
*G05B 11/01*    (2006.01)

(52) U.S. Cl.
USPC .......................................................... 700/19

(58) Field of Classification Search
USPC .......................................................... 700/19
See application file for complete search history.

(56) References Cited

U.S. PATENT DOCUMENTS 6,268,853 B1    7/2001   Hoskins et al.
6,999,841 B1 *  2/2006   Rutkowski .................... 700/181

(Continued)

FOREIGN PATENT DOCUMENTS

DE    19949558    4/2001
DE    10132036    1/2003

(Continued)

OTHER PUBLICATIONS

Georg "Framework—Basis eines"; Automatisierungssystems; 119(21):22-25 (1998).

*Primary Examiner* — Mohammad Ali
*Assistant Examiner* — Sivalingam Sivanesan
(74) *Attorney, Agent, or Firm* — Occhiuti & Rohlicek LLP (57) ABSTRACT

The invention relates to an automation system having a number of objects to to be controlled, wherein the automation system comprises a framework based controller (21) for controlling basic functions (23) of at least one object of the number of objects by means of object-specific functional units (25), wherein the controller (21) is configured independently of the object, and comprises standardized interfaces (26) for the communicative incorporation of the object-specific functional units (25) by means of preconfigured functional requests, wherein each functional unit (25) is associated with at least one of the objects and configured for actuating the respective basic function (23) of the respectively associated object by means of object-specific control functions, wherein each object of the number of objects may be virtualized in the controller (21) by means of the associated object-specific functional units (25), and the objects of the number of objects respond and can be controlled by means of the object-specific functional units (25) during at least one operating state of the automation system exclusively by the framework based controller (21), and each of the functional units (25) comprises one simulation module having at least one simulation function integrated in the respective functional unit (25), and may optionally be configured for carrying out the object-specific control function or for carrying out the at least one simulation function. The invention further provides a method for testing an automation system having a framework based controller, and a method for the framework based controlling of a respective automation system.

8 Claims, 4 Drawing Sheets

(56) References Cited

U.S. PATENT DOCUMENTS

| | | | |
|---|---|---|---|
| 7,117,049 B2* | 10/2006 | Horn et al. | 700/83 |
| 7,343,605 B2 | 3/2008 | Langkafel et al. | |
| 7,802,235 B2 | 9/2010 | Langkafel et al. | |
| 8,024,068 B2* | 9/2011 | Gray | 700/252 |
| 8,341,593 B2* | 12/2012 | Fildebrandt et al. | 717/105 |
| 2002/0049959 A1* | 4/2002 | Horn et al. | 717/106 |
| 2003/0004585 A1* | 1/2003 | Horn et al. | 700/18 |
| 2004/0128120 A1* | 7/2004 | Coburn et al. | 703/26 |
| 2008/0161940 A1* | 7/2008 | Gerwens et al. | 700/4 |

FOREIGN PATENT DOCUMENTS

| | | |
|---|---|---|
| DE | 10161064 | 7/2003 |
| DE | 10161140 | 7/2003 |
| DE | 10342909 | 4/2005 |
| EP | 1182529 | 2/2002 |

\* cited by examiner

AUTOMATION SYSTEM HAVING FRAMEWORK BASED CONTROLLER

CROSS-REFERENCE TO RELATED APPLICATIONS

This application is the National Stage of International Application No. PCT/EP2009/006332, filed on Sep. 2, 2009, which claims the priority of German Patent Application No. 102008047238.7, filed on Sep. 9, 2008. The contents of both applications are hereby incorporated by reference in their entirety.

The present invention relates to an automation system having a number of objects to be controlled, wherein the automation system includes a framework-based controller for controlling basic functions of at least one object of the number of objects by means of object-specific functional units, wherein the controller is designed independently of the object and includes standardized interfaces for the communicative incorporation of the object-specific functional units by means of preconfigured functional calls.

Due to continuously increasing complexity and increasingly diverging model variants of automated systems or automation systems, costs for their maintenance, further development and management are constantly increasing. Likewise, the costs and time required for setting up larger and larger and more and more complicated control programs as well as the training of programmers and maintenance engineers necessary for this also increase. At the same time customers want shorter delivery times simultaneously with products that have higher levels of functionality and greater flexibility.

Reducing the time and cost pressure resulting herefrom requires simplification and acceleration of the development process. However, current development and programming tools in automation technology do not provide adequate support here to support and optimize an entire development cycle in an automation system, generally from first planning through to commissioning and acceptance by the customer.

Consequently in the area of automation technology, attempts are being made to utilize analysis, design, documentation and coding tools, up to and including code generators and automatic testing systems, from the really large field of standard programming languages in general software development for the field of automation, said tools already having provided successful contributions to optimizations in the area of general software development. Object-oriented programming languages and tools, in particular, have proved advantageous in this respect. These are, however, practically unknown in the area of automation technology as there are no comparable equivalents here and, as a rule, it is not possible to take on the tools of general software development in an identical manner.

The reason for this is that to date chiefly so-called stored-programmable controllers (SPC) are used in the area of automation technology, the programming languages of which do not include any object-oriented language concepts or corresponding tools that are comparable to the standard programming languages in general software development. Partial attempts have already been made to include object-oriented language features and tools also in the programming languages of the SPC, such as, for example, IEC 61131 ST. First attempts to use this technology in the area of automation have been made, for example, using the software development system "CodeSys 3.0" produced by the company 3S Smart Software Solutions GmbH, which at present, however, is still in the development and trial phase.

As a rule, in automation technology entire product lines are provided with corresponding controllers. In this respect, in the majority of cases, the product lines include a plurality (1 to ca. 10) of different units or machines, which are interconnected by means of conveying modules, such that a product can run through the individual machines one after the other. Each individual one of these machines has a specific task to perform, such as, for example, cleaning, filling or packing a corresponding product. In spite of the individual machines having these different tasks and consequently also different demands being made on a respective controller of the machines and consequently on different controllers within a corresponding product line, there is an approach for generating and preparing a large proportion of reusable components for the automation of such types of product lines in order to minimize any possible development and modification expenditure necessary for the corresponding product line. Along with using identical mechanical and electronic components in the machines and modularising the machines for using similar-type modules in different machines in particular, this can also include modularisation of the respective controller. A controller that is structured in a correspondingly object-oriented manner is to contribute to this.

Consequently, one aim is to make advantages in the object-oriented programming languages useful in automation technology and to adopt available object-oriented tools (so-called OO tools) and corresponding mechanisms for automation technology. Consequently, the intention is to design controllers for automation technology in an object-oriented manner although the programming languages used do not explicitly support this approach.

In addition, the programming of machines in the field of automation systems has the disadvantage that even simple program functions can only be tested when the actual machine to be programmed has been completed (to the greatest possible extent). In order to get round this, test environments are normally set up in which parts of the programs can be tested in isolation. However, in the majority of cases these tests relate to individual assemblies, which means that the interaction between several assemblies, up to and including complex functions or even a complete machine, have up to now hardly been possible. Specialized programs do also exist but they presume the user has specialised knowledge, require a sufficiently precise description of the machine and its behaviour and, over and above this, have to be connected to the controller by means of suitable communication means (usually either direct simulations of the inputs and outputs (IO's) or proprietary protocols). This is very expensive and time-consuming and up to now has only been carried out in individual cases for individual special machines or for demonstration purposes. However, this method of operation is not practicable for efficient commissioning or software modifications, in particular for the construction of single machines in the field of automation systems.

Consequently, an additional aim is to provide a simple simulation and testing function for individual machines and automation systems or for their components.

SUMMARY OF THE INVENTION

To this end, an automation system having a number of objects to be controlled is provided according to the invention, wherein the automation system includes a framework-based controller for controlling basic functions of at least one object of the number of objects by means of object-specific functional units. The controller is designed independently of the object and additionally includes standardized interfaces for the communicative incorporation of the object-specific functional units by means of preconfigured functional calls. Each functional unit is associated with at least one of the objects and is configured for actuating the respective basic function of the respectively associated object by means of object-specific control functions. In addition, each object from the number of objects is imaged or virtualized in the controller by means of the associated object-specific functional units and the objects of the number of objects can be addressed and controlled exclusively by the framework-based controller by means of the object-specific functional units at least during an operating state of the automation system. In addition, each of the functional units includes a simulation module with at least one simulation function incorporated in the respective functional unit and is configured optionally for executing the object-specific control function or for executing the at least one simulation function.

Consequently an automation system with a number of objects to be controlled is described. This system can be, for example, a production line with different objects, such as, for example, machines, platforms or other hardware components, which in each case can execute at least one basic function. The term basic functions in this context refers to simple functional steps of an object, such as, for example, opening and closing valves or switching a motor on or off. In addition, the controller for the automation system is based on a so-called "framework". This framework provides a frame structure that is realized independently of the object. This means that said object-independent frame structure is designed in a universal manner and consequently can be used for different objects in order to activate in each case (indirectly) the basic functions of the corresponding objects. Object-specific functional units, which are provided and incorporated by means of preconfigured functional calls, are used for the direct activation of the objects or of their basic functions, the object-specific functional units being stored externally in a preconfigured manner and being designed especially for the respective object. To this end, the functional units include the object-specific control functions, which enable activation of the respective basic function of the respective object and consequently have to be adapted individually to the object and the respective basic function. The functional units are consequently associated with at least one special object, for which they have been configured. If several matching objects are used in the automation system, the corresponding functional unit can naturally be used several times for each of said objects.

The described separation between the object-independent controller and the object-specific functional units therefore means that the respective object-specific functional units are not stored in the actual framework source text of the controller. Said controller simply has at predefined positions corresponding functional calls in the form of interfaces, with which the object-specific functional units are then to be associated or are associated. Consequently the controller does not have to recognize the functional units themselves. Depending on the object to be actuated or the objects to be actuated, the object-specific functional units can be correspondingly exchangeable. The object-specific functional units provide, in particular, when or which basic function is to execute which task for how long. They consequently provide a control function which is designed especially for the respective object and which the basic functions controlled by the frame structure coordinate in a corresponding manner.

By means of the object-specific functional units and the defined interfaces, each object of the automation system to be actuated is imaged and virtualized in its controller. This means that all the hardware components or objects to be controlled are taken into consideration totally in the controller at least within the extent of the basic functions to be controlled and can be addressed and controlled by means of said controller. Therefore there is no hardware component to be controlled or no object to be controlled to which access is to be provided from outside the controller. All the checking on the objects to be controlled is therefore with the controller such that at least during operation of the automation system the objects can be addressed and controlled exclusively by the framework-based controller by means of the functional units. This is especially significant to the aspect of simulation discussed below. This aspect is also relevant to a change in objects of the automation system as on account of the design simply the functional units of the changed objects have to be individually adapted, but the framework-based controller can remain unchanged. This aspect is explained in even more detail below.

Over and above this, each functional unit includes a simulation module with at least one simulation function and is optionally configured for executing the object-specific control function or for executing the at least one simulation function. This means that each functional unit has a simulation characteristic and a selection can be made as to whether the control function incorporated in the functional unit or the simulation function is to be executed. The simulation function can be developed in such a manner that in a simulation mode the functional unit or the simulation module intercepts instructions to actuate the associated object, processes them and prepares signals that are provided in a normal mode by the object to be controlled. The job of the simulation module, therefore, is to simulate the presence of the real object to the higher-ranking instances of the controller such that said high-ranking instances communicate supposedly with the simulated object by means of the controller without noticing that this addressed object does not really exist or is not really addressed but is simply simulated. This means that it is possible to simulate each arbitrary object of the automation system without providing a simulation function in the framework-based controller itself. Obviously several objects can be simulated at the same time which means that it is also possible, where required, to simulate the entire automation system.

Corresponding to one embodiment of the automation system, it is defined in the functional unit whether the execution of the object-specific control function or the execution of the at least one simulation function is selected. This means that it is not the framework-based controller that states whether a simulation of the associated object is to start or the object is really to be addressed and controlled, rather it is the corresponding functional unit that decides this itself. The simulation can consequently be carried out without the knowledge of the controller. External events or corresponding parameterizations can be provided as criteria for this selection. As an alternative to this it is also possible, however, to provide a corresponding selection by means of the framework-based controller. In addition, several simulation functions can obviously be provided in the respective simulation module and they can be selected or even combined together for different simulation scenarios depending on the requirement. It is also possible, for example, to assemble a plurality of simulation functions in a library and to store them in the respective simulation module. The aspect of simulation is discussed below in more detail and in a more general form.

According to one embodiment, the incorporation of the object-specific functional units is effected at a start of the automation system, i.e. at the time the system starts. In this case the functional units are read into the controller by way of configuration parameters or are added in their source text and the controller is subsequently started.

As represented above, the framework-based controller includes preconfigured functional calls which function as entry points or as interfaces for the communicative incorporation of the object-specific functional units. The corresponding positions of the function calls consequently have to be identified and realized or specified and preconfigured when the controller is set up. A standard algorithm, for example, is then implemented into the controller, such as, for example, the so-called OMAC model (Open Modular Architecture Control), which is identical for all machines. Consequently, simple transferability to other types of objects can be realized.

As the framework-based controller is independent of the actual object, it is possible, in the event of a modification, expansion or fault elimination, to modify the pure framework-based controller portion at any time for an arbitrary number of different machines of a product line separately from object-specific functional units for all objects, for example within an update. In this case there is no danger of performing modifications in the external object-specific functional units or function-specific modules as these are arranged outside the framework-based controller.

To this end, implementation of the framework-based controller follows the above-described approach of object-oriented programming, according to which components of the automation system can be assembled to form (virtual) objects. As also described above, object-oriented programming (OOP) has already proved advantageous in standard programming languages in general software development, such as C++ and Java, as with its help complex problems can be clearly structured and eliminated without many errors. These advantages are produced, among other things, from the manner in which problems are approached established therefrom, its structuring and a corresponding subsequent development process. Consequently, object-oriented programming is not simply only the use of another—consequently object-oriented—programming language, but a consistent conversion of a particularly structured method of operation. Consequently, an object-oriented method of operation even with the lack of support up to now in the area of automation can be obtained by applying a suitable object-oriented method of operation with the aid of currently available tools.

In previous conventional, non object-oriented programming languages in the area of automation, the difference is normally made between an actual program (statement part) and (static) data. Operation logic is controlled by a controlled sequence of calls of previously suitably defined functions. A decision as to with which object (for example with which motor) at which time which basic function is to be executed, is made by transferring a corresponding data structure to a function especially defined in each case for this.

The result, as a rule, here is that corresponding process logic and data structures to be used are treated, modelled and documented separately from one another. A machine model can consequently be found again in part in process logic, which represents its dynamic part, and in part in the data structures that represent its static part.

Where an implementation of the controller of the automation system is object-oriented, this "artificial" separation between process logic and data or data structures, i.e. between dynamics and statics, is avoided initially in that both are joined together formally, i.e. virtually, to form one unit. Said unit forms a so-called "object". However, as a rule, this brings about pure resorting and sectional duplication of a corresponding source text of the controller. In order to prevent this, objects can be joined together to form new objects. The object-oriented implementation, realized in the majority of cases as object-oriented programming, consequently allows objects to contain other objects and to build up relationships with each other. For example, a drive declared as an object can include several motors, which also represent respective objects. In this way assemblies, machine parts or function units can be combined to form more complex virtual units. For example, it is possible to represent these units graphically in the form of a tree-like structure within a structure plan. An object-oriented implementation of the controller can be realized accordingly in an equivalent manner such that the controller structure created in this way mirrors the real machine structure.

This offers the advantage of simpler documentation as a corresponding controller structure and implementation exists in relation to the physically present hardware of the machine structure which means that generation of an object-oriented controller is simplified. An application of abstract classes, interfaces, polymorphism and dynamic links, as known from general object-oriented programming, have not been possible up to now for programming in the field of automation. However, in automation technology these types of possibilities, such as, for example, dynamic storage administration, virtual methods or abstract classes, can be dispensed with or they can be replaced in part by automatic source text generation, as a controller, as a rule, refers to concrete, known objects with concrete addresses and functions which means that dynamic adaptation is generally not necessary.

In general software development so-called patterns, which describe frequently occurring design problems and generic solution strategies that are universally applicable, have been used for some time in object-oriented programming. Whereas so-called "architecture patterns" refer to the architecture of software systems, so-called "design patterns" are much less abstract and refer more to a software coding.

Using and handling these patterns in a corresponding manner in the field of automation enables a clear improvement in a communication structure compared with previous controllers and consequently more precision, quicker understanding and fewer error sources. Patterns basically enable programs and systems with the same type of structure. This means that incorporation into existing systems is made easier as software design and structures can be quasi standardized according to the patterns if, when using different development environments and programming languages, care is taken to ensure an implementation is as standard as possible and language-specific special solutions are avoided to guarantee transferability.

A demarcation between an application of patterns and a usual conversion of standardizations known up to now is that patterns allow more space for interpretations and for the manner of implementing functions. Rather they represent a possible preliminary stage for standardization or help in the structuring and implementation of similar problem definitions. Apart from controlling machine components, special patterns can also be provided for error processing, so-called MMI links, i.e. standardized interfaces for operating a system via corresponding visualizing systems, for the purposes of parameterization or emergency cutout processing.

Figure 1:
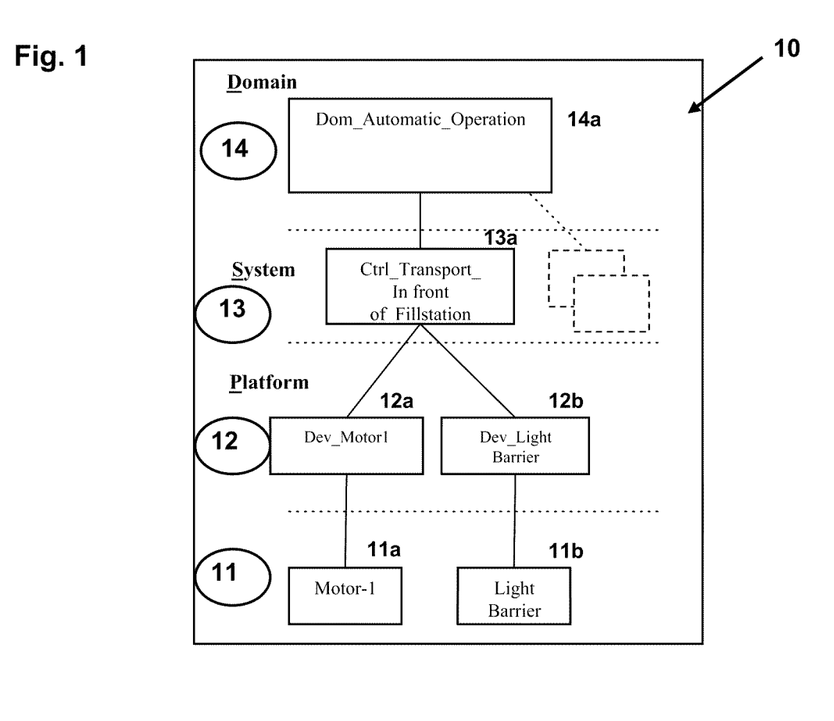
FIG. 1 shows a schematic representation of a possible architecture pattern with three hierarchy layers.

FIG. 1 shows an exemplary so-called "DAP pattern" as an example of an architect pattern for an automation system, said pattern being formed by a component hierarchy with three layers. The corresponding controller is consequently built up by a number of components, the respective components basically being transferable into other controllers or programs. Contrary to this, according to the prior art, program parts are, as a rule, stored in so-called "libraries" for reuse. These libraries, as a rule, include a large number of functions for processing a certain topic, such as, for example, aspects of graphics, mathematics, communication or movement. However, these types of libraries, as a rule, are not designed in a deterministic and context-independent manner. This means that the libraries include a collection of different program parts that are not inevitably tailored explicitly to the present case in application. In addition, said libraries have to be "learnt" and incorporated in the corresponding program code. This makes the program code of the controller larger and consequently increasingly more complex. The controller also has to be amended if modifications are to be performed to the library. Processing to be performed independently of each other is consequently not possible. Libraries are therefore designed for arbitrary contexts, as a result of which they have obviously to be developed in a more variable and less specific manner.

Contrary to this, the field of automation enables a targeted forming of components for example in a product line and consequently provides a specific context, which, as a rule, only changes a little. In the case of a product line from the field of automation, there is a special focus on the products, which are to be created or generated on the product line. In this respect, the components by definition can no longer be considered totally independently from each other, but always within the framework of the entire product line, as there is a certain interaction of the direct or indirect type between the components, which, accordingly, has to be taken into consideration. The components of the product line can be divided into three categories in accordance with the underlying approach of the architecture pattern shown in FIG. 1:

1. Platform components
2. System components
3. Domain components

Platform components produce so-called basic services within each application of the product line and abstract the underlying hardware. They represent the most general components and with so-called "device" drivers are comparable to standardized interfaces. The type of platform components used in each case in the product line depends on the field of application of the product line. Typical examples of the services of platform components are the communication with hardware components, such as, for example, motors, pumps or valves. A platform component (device driver) for example in the case of the motor encapsulates the hardware-specific characteristics of the motor and supplies access to its basic functions via an idealized interface such as, for example, a start and stop function. In this case, the so-called system components, which are arranged on the next higher hierarchy stage, have exclusive access to the platform components.

These system components contain the principle process logic for example for a product line as composition of a number of platform components and, where applicable, further system components. They are consequently also referred to as "controller". Consequently a change in an underlying platform or a replacement of individual components exclusively requires modifications to the platform components, as the system components building thereon communicate with the respective platform components via standardized interfaces. The system components are consequently general and have no specific reference to the products produced on the production line. The system components themselves are checked by higher-ranking domain components for controlling the entire system behaviour or the product line.

The domain components consequently include a corresponding application logic for more complex applications up to and including actual machine logic. They use or control exclusively the aforementioned system components or other domain components for controlling the entire specific system behaviour. They consequently also represent controller components, which, just as the system components, control lower-ranking components. Each of the three named components can consequently be provided with a framework-based controller programmed in an object-oriented manner, the objects comprising, for example, in each case the lower-ranking components and consequently differing from the objects of other components. The controller itself does not have to be modified in this case. The object-specific functional units are simply adapted to the respective objects.

For clear structuring and to enable reusability, interchangeability and maintainability, the functional calls to control the lower-ranking components should always refer to the correspondingly lower-ranking hierarchy stage, however should not jump over several hierarchy stages, such that clear grouping of the lower-ranking components to form objects is made possible. According to these defaults, in a model structured according to the DAP pattern described in FIG. 1, communication relationships only occur in the vertical direction. Tree-like structuring of the model can already be seen in this model. This structuring is oriented close to the corresponding hardware structure such that there is an analogy between hardware and software, which makes it simple and easy to understand the respective software model. This design is made possible in particular by an object-oriented method of operation for programming represented above. Analogous to the relationship between the individual hardware components, functions of objects are consequently controlled by higher-ranking objects.

The aspect of simulation already described above is discussed in more detail below in a general form. Accordingly objects can be simulated by means of the simulation module and signals or instructions of the controller for controlling basic functions of at least one object of the automation system are received by the respective simulation module. For example, this means that the hierarchy level of the hardware actuated by the platform components can be replaced by the simulation module, for example in the form of a correspondingly equipped arithmetic unit or in the form of a corresponding source text or program/program part, such that the respective platform components can communicate with the simulation module. All higher-ranking components above the platform components are not influenced by this exchange and consequently perform their normal operation. Obviously, it is also possible for a higher hierarchy layer to be replaced and correspondingly simulated.

This aspect of simulation therefore assumes that each physical device of a machine (referred to above as an object) that can be "achievable" through software and consequently can be either activated and/or interrogated (or both), can be simulated, where required, directly in said software. Each physical element of hardware therefore obtains a direct equivalent in the software, which has been referred to above, for example, as a functional unit. Consequently, for example each light barrier is imaged by a program section or source text section "DEV_light barrier", each temperature transmitter by a "DEV_temperature", each motor by a "DEV_motor", etc. In software engineering, an element or object that is used numerous times in the machine or in the automation system, must naturally only be programmed once as a functional unit and then instanced in a correspondingly frequent manner. This programming corresponds to the forming of a class, as has already been introduced above. Instancing an arbitrary number of elements of said class consequently corresponds to the declaration of variables of said class.

Figure 4:
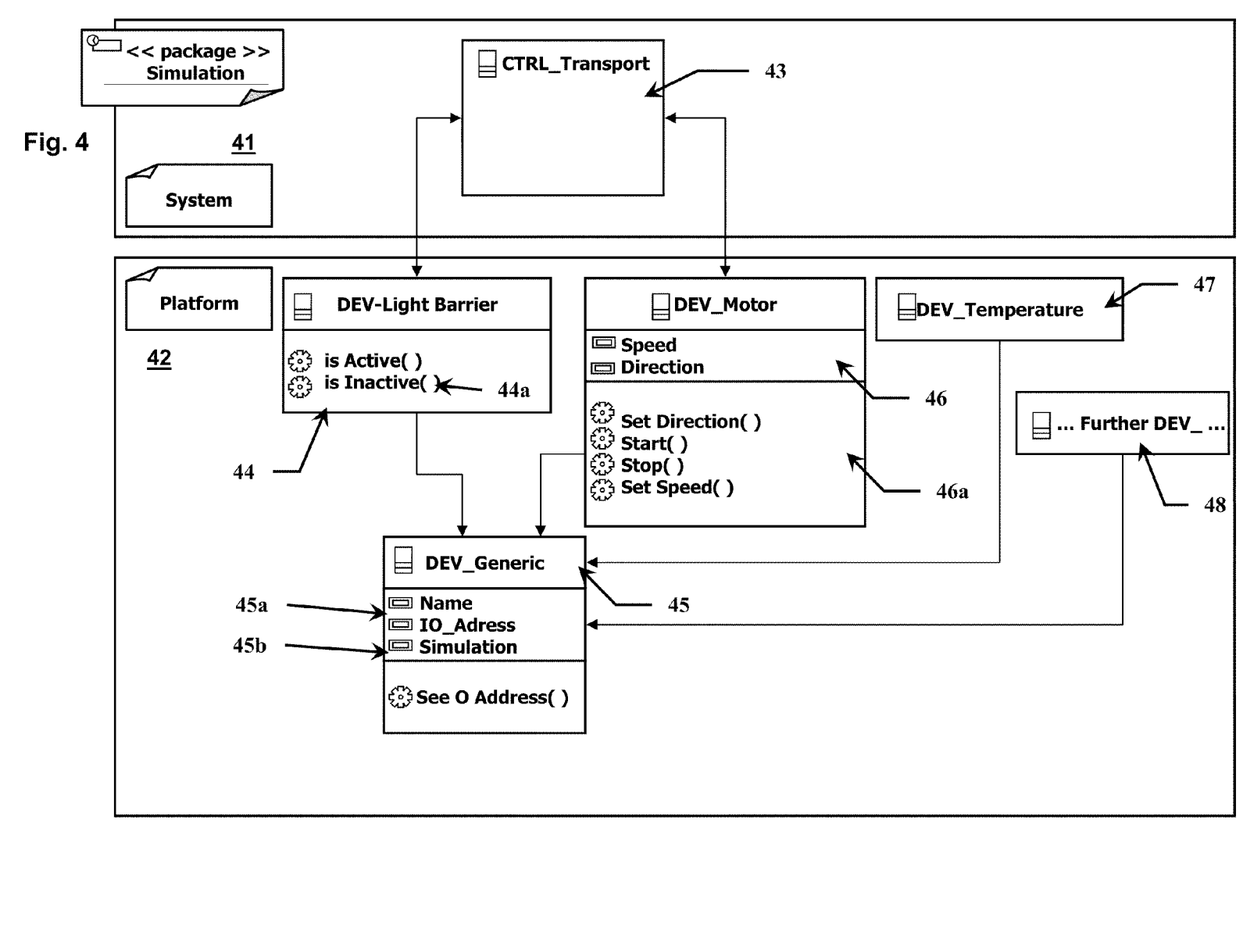
FIG. 4 shows a schematic representation of another design of the framework-based controller.

The classes that represent a physical element begin in the following description with the prefix "DEV_". They form both an abstract layer of hardware (device driver) and the simulation elements. This can be seen in FIG. 4. In a useful manner, such a "DEV" element can be divided into several files such that, e.g., the simulation part in the form of a simulation module can be easily separated from the actual control software of the functional unit. Therefore whenever the controller communicates with a hardware element, no input or output of the hardware is used, for example by setting or resetting a bit among other things, rather the device provided for this hardware is used by calling the method sensible for the hardware element. Therefore the corresponding control function of the functional unit is used. An underlying source text or program section can be built up, for example, in such a manner:

```
        ...
        Lightbarrier1: DEV_lightbarrier;
        Motor1: DEV_MOTOR;
    ...
    Begin
        If lightbarrier1.isOn( ) then begin
            ...
            Motor1.SetSpeed (...);
            Motor1.Start(...)'
        End;
    End;
...
```

In this way there is no direct reference to the elements or objects actually used at any point in the actual source text or source code. Each physical link between hardware and software is hidden in the platform layer, i.e. in the functional units. As all so-called "devices" come from an abstract base class: DEV_generic" or are deduced from the same, all "devices" have both a name for identification, a physical 10 address and a so-called "flag" or a switch to switch the simulation on or off. If, however, no real machine (i.e. no object) is present, or if a simulation is desired for other reasons, the devices, with the corresponding configuration, can themselves decide how they will behave. In the case in example of a light barrier, this could be represented as follows:

```
DEV_lightbarrier
...
Method isON( )
...
If not simulation then begin
    Return IO_address; /* return actual value of the lightbarrier */
Else /* simulation active*/
    Return TRUE; /* simulate constantly switched on lightbarrier */
End_if;
...
```

In this case, therefore, the value "TRUE", which corresponds to a permanently active light barrier, is set permanently during a simulation. In reality this simulation part can naturally be arbitrarily costly and can be further developed and perfected as the development of the machines progresses.

Splitting the simulation part (hereafter referred to as part 2) as a simulation function of the simulation module from the control function (part 1) of the functional unit offers the advantage that the simulation part, where required, such as for example delivering the machine to the customer, can be split off. Thus, separation into two parts can be represented for example as follows:

```
Part 1:
Method isON( )
...
If not simulation then begin
    Return IO_address; /* return actual value of the lightbarrier */
Else /* simulation active */
#ifdef WithSimulation
    CALL simulation( );
#endif
End_if;
...
Part 2:
Simulation( ) /* simulation active */
    Return TRUE; /* simulate constantly switched on lightbarrier */
End_if;
...
```

In this case, however, the simulation model in the form of part 2 cannot simply be omitted as otherwise a compiler when compiling would throw out an error message as a correspondingly provided call of the simulation function "CALL simulation ( )" would then no longer be valid. The call "CALL simulation ( )" in part 1 could consequently be disabled or switched off, for example, by a so-called compiler switch as a switch in the form of "#ifdef WithSimulation". Setting this switch consequently removes the simulation from the software.

In addition, as already described above, several simulation functions can be combined in a library. Over and above this, different libraries can also include different simulation scenarios or simulation scenarios can be controlled by extreme events or parameterizations. This aspect is advantageous in particular for continuous testing during the further development of the entire controller or of the software as in this case arbitrary combinations, test system formations and sequences in particular of error states are possible and can be repeated as often as required and in an arbitrary sequence. This means that with continuous further development of the simulation or test "cases" or scenarios, total coverage of all the relevant test functions is possible in the long-term. Tests can be reproduced at any time and can be executed and evaluated automatically over long periods.

A further advantage is produced from the fact that this type of testing at the beginning or in a first stage does not assume total machine description, as this is created per se with the instancing of the objects from the classes. The elements established in the upper layers "know" nothing of the actual hardware and behave totally normally according to their provided tasks. Over and above this, a modification to the machine incurs a direct modification to the simulation in so far as the modifications are to the objects of the automation system, such as, for example, actuator technology, sensor technology or conveying elements ("motion"), etc.

According to another embodiment, the interfaces are additionally provided for the communicative incorporation of the function-specific modules for the respective object.

Along with the object-specific functional units, additional modules can consequently be executed by the framework-based controller in the same manner. The modules can provide, for example, new functionalities for the controller, which, for example, can take into consideration and incorporate individual wishes of customers. Thus, a customer can have, for example, in-house programs run without having to intervene in the framework source text, in order, for example, to interrogate counts of a counter, to trigger reports in the event of error states or to program a customer's in-house controllers, etc. Consequently, in this way no errors, resulting, where applicable, in unwanted behaviour of the corresponding object, can be built into the controller.

In addition, the at least one object can include at least one automated machine. This means that a so-called "object" of the controller can combine one or more machines to form a virtual unit. In the end the complete production line can be combined in this way to form one single object, which is formed from objects or individual machines, which in their turn are aggregated from further objects that can comprise, for example, platform components and their parts.

Corresponding to another embodiment, the automation system includes at least one product line with a number of objects, which are realized as automated machines.

In addition, the framework-based controller can also have a structure that mirrors a structure of the automated machines of the automation system. This means that, as already described above, each machine or parts of the respective machine can be identified as an individual object or as individual objects in the controller such that a structure of the automation system matches the structure of the controller.

In addition, access to the controller can be protected. This can be effected, for example, by means of a password or other suitable access-restricting measures, as a result of which the framework-based controller is protected from unwanted manipulation. However, machine-specific elements, such as the object-specific functional units or the function-specific modules, remain unchanged by this and can be modified or adapted.

Corresponding to a further embodiment, a source text or source code of the framework-based controller can be automatically generated.

In addition, a method for testing an automation system with a framework-based controller is provided according to the preceding description, wherein the automation system comprises a framework-based controller for controlling basic functions of at least one object of the number of objects by means of object-specific functional units. The controller is realized independently of the object and comprises standardized interfaces for the communicative incorporation of the object-specific functional units by means of preconfigured functional calls. The method also includes a first selection step for the optional execution of an object-specific control function or the execution of the at least one simulation function by the functional unit.

According to one embodiment, the first selection step is executed by the functional unit.

In addition, a method is provided for the framework-based controlling of an automation system for controlling basic functions of at least one object of the automation system by means of a framework-based controller, wherein the controller is realized independently of the object, said method having the following steps:

reading-in object-specific functional units by the controller at a start time of the automation system by means of functional calls via standardized interfaces for the communicative incorporation of the object-specific functional units, selecting at least one object-specific control function included in the functional units or at least one simulation function incorporated in the simulation modules of the functional units, executing the at least one function selected.

The present description also covers a computer program with program code, which executes all the steps of the method for the framework-based controlling of an automation system, if the computer program is executed on a computer or a corresponding arithmetic unit.

In addition, the present description covers a computer program product with program code means which are stored on a computer-readable data carrier in order to execute all the steps of a method for the framework-based controlling of an automation system, if the computer program is executed on a computer or a corresponding arithmetic unit.

Further advantages and developments of the invention are produced from the description and the annexed drawings.

It is obvious that the above-mentioned features and the features yet to be mentioned below can be used not only in the respectively provided combinations, but also in other combinations or standing alone without departing from the framework of the present invention.

The invention is schematically represented in the drawing by way of an exemplary embodiment and is described below in detail with reference to the drawings.

DETAILED DESCRIPTION

FIG. 1 shows an architecture pattern with the example of a so-called "DAP pattern", which can form the basis of a framework-based controller and which comprises a component hierarchy that includes three component layers 12, 13, 14 and a lower-ranking hardware layer 11. In practice, it is definitely possible for plainly more than three component layers to be used in order to make further abstractions possible. The hardware layer 11 comprises a motor 11a and a light barrier 11b, which are each controlled by a so-called platform component 12a or 12b, these being located in the layer of the platform components 12. These are controlled in their turn by a system component 13a, which is located in the system layer 13. The so-called domain component 14a, which controls the system component 13a and is located in its turn in the domain layer 14, is higher-ranking. As can be seen from the schematic representation, the respective component of a certain layer of the hierarchy represented is only controlled in each case by the component located directly above. An overlapping controller over several hierarchy layers is not provided as this would disturb the intended modular design of the component hierarchy. This limitation explicitly refers only to an overlapping controller which would pass over intermediately ranked components. Obviously, a platform component can also definitely be actuated directly by a domain component without obstructing the modular structure.

Figure 2:
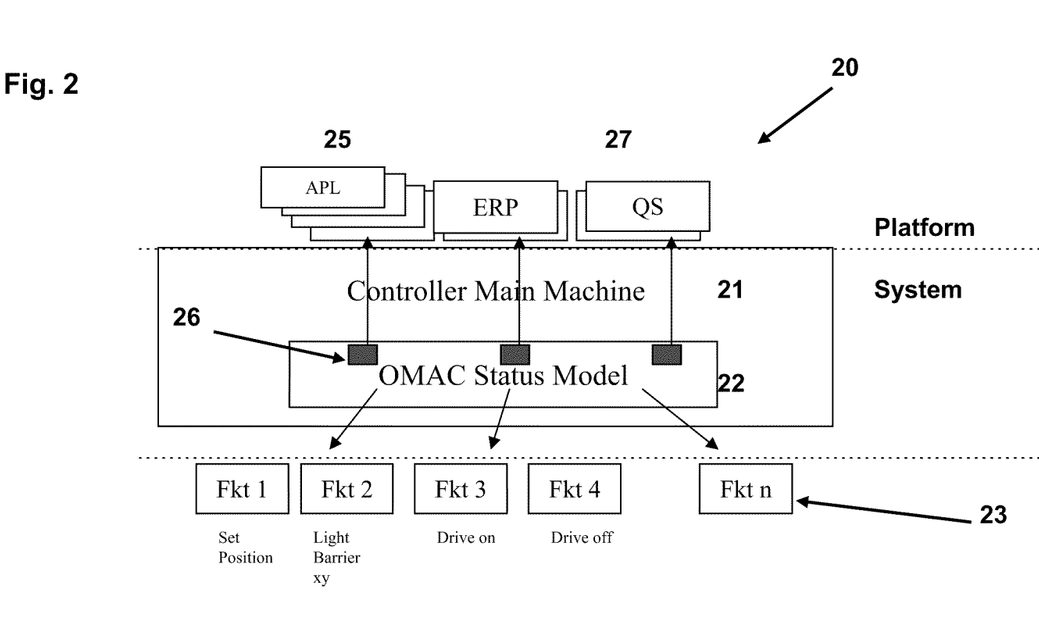
FIG. 2 shows a schematic representation of a design of an embodiment of a framework-based controller.

FIG. 2 shows an example of a framework-based controller 21 for an automation system 20. This framework-based controller 21 is based on a so-called "state machine" 22, which is formed by a standard algorithm, which can be realized identically for different types of machines and controls basic functions 23 of an object or a machine. These basic functions can include, for example, the defined behaviour at a certain position ("set position"), the actuation or monitoring of a light barrier ("lightbarrier. xy") or the controlling of a drive ("drive on", "drive off") and can be expanded by further arbitrary functions ("Fkt n"). This status model can correspond, for example, to the so-called "OMAC" standard (or Weihenstephan standard).

The OMAC standard (Open Modular Architecture Controls) describes possible states of a machine and possible state transitions and actions together with their respective before and after conditions. In this way, with the aid of the framework-based controller, standard implementation for the underlying state machine can be realized and provided, said standard implementation being identical for all machines of a product line or system and defining a system layer that is not dependent on an object. Machine-specific functions or object-specific functional units 25 in an object-specific platform layer must be separated from this implementation. These are communicatively incorporated via standardized interfaces 26 by means of pre-configured functional calls and allow integration of a customer's own implementations, such as, for example, a customer's own applications ("APL"), or functions for error correction ("ERP"). In this case, for example a labelling machine, when transferring from a "starting" state to an "execute" state, behaves differently to a packing machine on account of the functions that are running. The "execute" state itself can also be executed differently on the respective machines. Consequently, the implementation of the state machine must be separated from the implementation of the object-specific functional units of the respective machine. The same applies to function-specific modules 27 and expansions as well as to corresponding interfaces to hardware (devices). Contrary to software programming with an object-oriented programming language, these functionalities are not converted by using abstract classes and interfaces, but rather are identified in the field of automation engineering and are implemented separately, as represented in subsequent FIG. 3.

Figure 3:
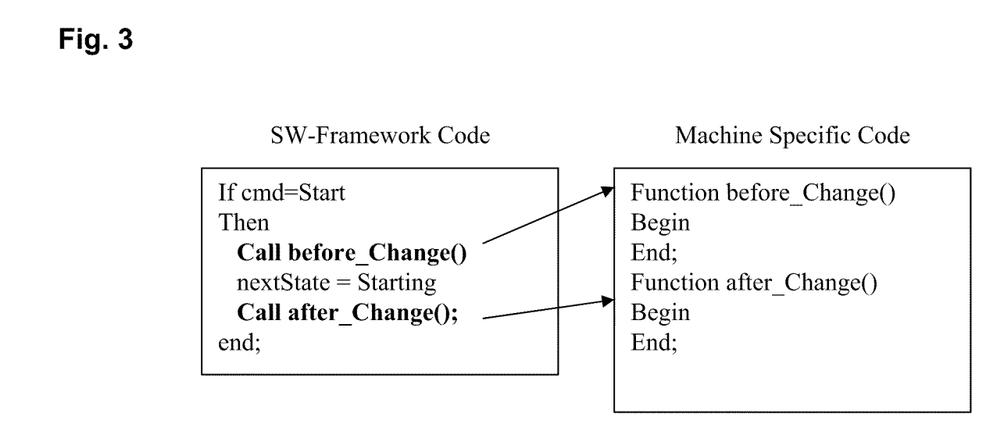
FIG. 3 shows a detail of an embodiment of a framework-based controller as an extract from an underlying source code.

FIG. 3 shows a detail of a source code of an embodiment of a framework-based controller ("SW framework code) for a automation system, which represents a state change from an "idle" state ("stopped") to a "starting" state ("start"). In this case function calls ("Call before_Change( )" and "Call after_Change( )") are introduced at defined points of the framework-based controller. These allow the controller to be separated from various function-specific, object-specific or platform-specific functions ("Function before_Change( )" and "Function after_Change( )"), which are stored in the externally arranged object-specific functional units or function-specific modules ("machine-specific code"). In this way, introducing additional source text or source code for these functions into the framework-based controller is avoided. In order to avoid error messages of a compiler at these interfaces, the functional calls have to be declared. This declaration takes place outside the framework source code. Consequently, where this method of operation is consistently maintained, the function-specific, object-specific or platform-specific functions can basically be stored in external packets or files.

The framework-based controller can consequently be realized independently of the creation of object-specific functional units or of function-specific modules. Once the framework-based controller has been completed independently of the object, the machine-specific functionalities can then be incorporated by means of the object-specific functional units via functional calls to be provided in each case at previously identified positions. The framework-based controller itself remains unchanged in this case. This naturally also applies to implementation of interfaces to external systems, such as, for example, MMI, ERP, or error processing as well as to hardware interfaces. Thus, customers, for example, can have their own programs executed without having to intervene in the framework-source code of the controller, for example, in order to interrogate counter states, to trigger reports on error states or to program a customer's in-house controllers etc. Consequently, error sources in the controller, which, where applicable, for example, result in unwanted behaviour of the corresponding object, can be minimized in this way. Within the framework-based controller, each layer of the hierarchy structure, as is represented in FIG. 1, has its own functional calls. These are independent of functional calls of other layers and are shown schematically in FIG. 2. In this case it is not absolutely necessary for all functional calls to be able to communicate with an object-specific functional unit, it is also possible to execute them as so-called "empty" functional calls, which have no function or can be linked at a later time to an object-specific functional unit or a function-specific module.

FIG. 4 shows a schematic representation of a further design of a controller for an automation system. Here a framework-based controller (43) as an object-independent part forms an object-independent system layer (41). In the embodiment represented, physical elements or objects (not shown) of the underlying automation system, namely a light barrier, a motor and a temperature sensor, are imaged or virtualized in each case by an equivalent in a so-called platform level (42) in the form of a functional unit (44, 45, 46, 47, 48) and are characterized for identification, for example, by the prefix "DEV" as an abbreviation for "device".

Each functional unit (44, 45, 46, 47 48) has in each case a number of control functions (44a, 45a, 46a) for actuating the real objects (not shown). In addition the functional units (44, 45, 46, 47, 48) can each have a simulation module (45b), which for reasons of clarity is only shown in the functional unit (45) but can be provided, in principle, in all the functional units (44, 45, 46, 47, 48). Consequently, by means of the functional units (44, 45, 46, 47, 48) the platform level (42) forms both an abstraction layer of the hardware (device driver) and the simulation elements. The functional units (44, 45, 46, 47, 48) can be in direct contact with the framework-based controller (43) by means of standardized interfaces. Likewise, it is also possible for functional units (45) to be in contact with other function units (44, 46, 47, 48).

Therefore whenever the controller (43) wants to communicate with a hardware element, no input or output of the hardware is used, for example by setting or resetting a bit among other things, rather the function unit (44, 45, 46, 47, 48) provided for this hardware is used by calling the corresponding control function (44a, 45a, 46a) of the functional unit (44, 45, 46, 47, 48). An underlying source text can be constructed, for example, as follows:

```
   Lightbarrier1:DEV_lightbarrier;
   Motor1:DEV_MOTOR;
   ...
   Begin
      If light barrier1.isOn( ) then begin
         ...
         Motor1.SetSpeed (...);
         Motor1.Start(...);
      End;
   End;
   ...
```

The advantage offered by this design is that no direct reference to the elements or objects actually used has to be made at any point in the actual source text of the framework-based controller (43). Rather, each physical connection between hardware and software is hidden in the platform layer (42), i.e. in the functional units (44, 45, 46, 47, 48).

The invention claimed is:

1. An apparatus comprising a production line having a plurality of automated machines, transport modules connected between said automated machines for enabling a product to pass from one of said automated machine to another of said automated machines, and an automation system for controlling said automated machines, said automation system comprising a framework-based controller for controlling basic functions of said automated machines, each of said automated machines corresponding to an object that is virtualized in said framework-based controller by an object-specific functional unit assigned to said object, said object-specific functional unit further comprising a simulation module having a simulation function, and an object-specific control function for actuating basic functions of an object to which said object-specific functional unit is assigned, said object-specific functional unit being configured to selectively execute one of said simulation function and said object-specific control function, said framework based controller having a structure reflecting a structure of said automated machines, wherein said framework-based controller is designed independently of the objects, wherein said framework-based controller comprises standardized interfaces for communication technology-based incorporation of the object-specific functional units by means of preconfigured functional calls, wherein each object from the number of objects is virtualized in the controller by means of the associated object-specific functional unit and wherein, during an operating state of the automation system, said objects are accessed and controlled exclusively by said framework-based controller using said object-specific functional units.

2. The apparatus of claim 1, wherein the functional unit defines whether the execution of the object-specific control function or the execution of the simulation function is selected.

3. The apparatus of claim 1, wherein the standardized interfaces are additionally provided for the communication technology-based incorporation of external function-specific modules for the respective object, said external function-specific modules being disposed outside said framework-based controller.

4. The apparatus of claim 1, wherein access to the framework-based controller is protected while permitting access to object-specific functional units.

5. The apparatus of claim 1, wherein a code of the framework-based controller can be automatically generated.

6. A method for testing an automation system having a framework-based controller as recited in claim 1, said method comprising using an object specific functional unit to execute an object specific control function and a simulation function.

7. A method for controlling basic functions of automated machines in a production line, said automated machines being connected to each other by transport modules for conveying products between said automated machines, said method comprising assigning an object-specific functional unit to each of said automated machines of said production line, thereby virtualizing each of said automated machines as a corresponding object, providing a framework-based controller realized independently of the objects, said framework-based controller having a structure reflecting a structure of said automated machines, at a start time of operating said automation system, causing said framework-based controller to read in an object-specific functional unit by means of at least one functional call via at least one standardized interface of the framework-based controller for the communication-technology based incorporation of the object-specific functional units, selecting a function selected from the group consisting of an object-specific control function included in the object-specific functional unit and a simulation function incorporated in a simulation module of the object-specific functional unit, and executing the selected function.

8. A tangible computer-readable medium having encoded thereon software that, when executed by a computer, causes execution of the method of claim 7.

* * * * *